US011169857B2

(12) United States Patent
Tsirkin

(10) Patent No.: US 11,169,857 B2
(45) Date of Patent: Nov. 9, 2021

(54) SYSTEM AND METHOD FOR RESERVING A PORTION OF CPU TIME FOR HOST EXECUTION

(71) Applicant: Red Hat, Inc., Raleigh, NC (US)

(72) Inventor: Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 226 days.

(21) Appl. No.: 15/989,819

(22) Filed: May 25, 2018

(65) Prior Publication Data

US 2019/0361749 A1 Nov. 28, 2019

(51) Int. Cl.
*G06F 9/50* (2006.01)
*G06F 9/48* (2006.01)
*G06F 9/455* (2018.01)

(52) U.S. Cl.
CPC ........ *G06F 9/5077* (2013.01); *G06F 9/45558* (2013.01); *G06F 9/485* (2013.01); *G06F 2009/45575* (2013.01)

(58) Field of Classification Search
CPC .... G06F 9/5077; G06F 9/45558; G06F 9/485; G06F 2009/45575
See application file for complete search history.

(56) References Cited

U.S. PATENT DOCUMENTS

| | | | | |
|---|---|---|---|---|
| 7,433,951 | B1* | 10/2008 | Waldspurger | G06F 9/5016 709/226 |
| 8,429,276 | B1* | 4/2013 | Kumar | G06F 9/45533 709/226 |
| 8,671,403 | B2 | 3/2014 | Sundarrajan et al. | |
| 9,454,478 | B2 | 9/2016 | Waldspurger | |
| 9,785,460 | B2 | 10/2017 | Zheng | |
| 2006/0075402 | A1* | 4/2006 | Neiger | G06F 9/45558 718/1 |
| 2007/0288224 | A1 | 12/2007 | Sundarrajan et al. | |
| 2013/0145377 | A1* | 6/2013 | Chen | G06F 9/45545 718/104 |
| 2014/0082612 | A1* | 3/2014 | Breitgand | G06F 9/5005 718/1 |
| 2014/0331222 | A1* | 11/2014 | Zheng | G06F 9/45558 718/1 |

(Continued)

OTHER PUBLICATIONS

Song et al. "Schedule processes, not VCPUs." Proceedings of the 4th Asia-Pacific Workshop on Systems. ACM, 2013, pp. 1-7. (Year: 2013).*

(Continued)

*Primary Examiner* — Meng Ai T An
*Assistant Examiner* — Willy W Huaracha
(74) *Attorney, Agent, or Firm* — Lowenstein Sandler LLP

(57) ABSTRACT

Systems and methods for scheduling, within a virtual machine, central processing unit time to be reserved for host machine execution of tasks are described. An example method may include execution, by a hypervisor running on a host computer system, a virtual machine comprising a virtual central processing unit. The virtual central processing unit is associated with a physical central processing unit of the host machine. The hypervisor determines a portion of central processing unit time to be reserved for host execution. The hypervisor notifies the virtual machine of the portion of central processing unit time that is reserved for host execution.

20 Claims, 11 Drawing Sheets

(56) References Cited

U.S. PATENT DOCUMENTS

2017/0068554 A1    3/2017    Tsirkin

OTHER PUBLICATIONS

Uhlig et al. "Towards Scalable Multiprocessor Virtual Machines." Virtual Machine Research and Technology Symposium. 2004, pp. 43-56 (Year: 2004).*
Miao et al. "FlexCore: Dynamic virtual machine scheduling using VCPU ballooning." Tsinghua Science and Technology 20.1 (2015): pp. 7-16. (Year: 2015).*
Suo et al. "Preserving I/O prioritization in virtualized OSes." Proceedings of the 2017 Symposium on Cloud Computing, pp. 269-281 (Year: 2017).*
VMware, Inc., "Understanding Memory Resource Management in VMware® ESX™ Server", 2009.

* cited by examiner

SYSTEM AND METHOD FOR RESERVING A PORTION OF CPU TIME FOR HOST EXECUTION

TECHNICAL FIELD

This disclosure relates to computer systems, and more particularly, to virtual central processing unit scheduling for virtual machines.

BACKGROUND

A virtual machine is a portion of software that, when executed on appropriate hardware (e.g., a server, a mainframe computer, etc.), creates an emulated execution environment. The actual physical computer system is typically referred to as a "host machine," and the operating system of the host machine is typically referred to as the "host operating system." A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, backing up the state of virtual machines periodically in order to provide disaster recovery and restoration of virtual machines, etc.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
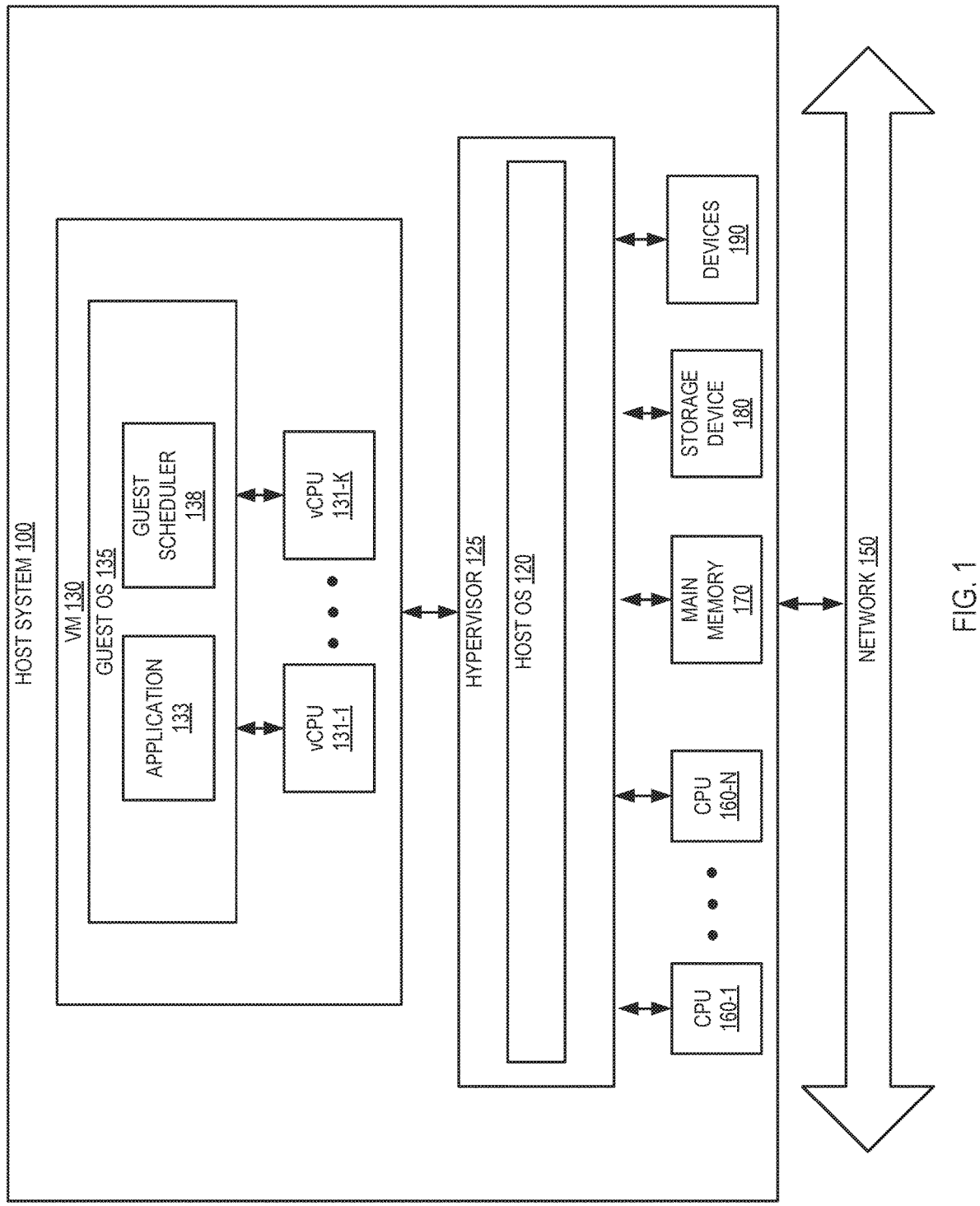
FIG. 1 depicts a component diagram of an illustrative example of a computer system, in accordance with one or more aspects of the present disclosure.

Described herein are systems and methods for scheduling virtual processors in a manner which reserves physical processor time for host execution. A hypervisor manages execution of virtual machines on a host machine including provisioning resources of a physical central processing unit (CPU) attached to the host machine to each of the virtual machines (VMs) running on the host machine. Provisioning of physical CPU resources by the hypervisor may include associating provisioned resources to one or more virtual central processing units (vCPUs) that are associated with respective VMs. A vCPU may be provided by a core of the physical host CPU or a number of time slots reserved from one or more cores of the physical host CPU. For example, the hypervisor may provision 25% of a physical CPU core to a VM. This provisioning may be reflected as associating the provisioned 25% of the physical CPU time to vCPU1, where vCPU1 is associated with VM1.

The provisioned vCPU allows the VM to execute directly on the physical CPU. Software executing in the VM operates with reduced privileges such that the hypervisor retains control over resources. The hypervisor retains selective control of the processor resources, physical memory, interrupt management, and I/O. Operations performed by the physical CPU may be referred to as virtual machine extension (VMX) operations. There are two kinds of VMX operations, VMX root operations and VMX non-root operations. VMX root operations are operations performed by the hypervisor. VMX root operations are treated like any other root operations where full control over the physical CPU is allowed. VMX non-root operations are operations performed by the VM. VMX non-root operations are restricted to facilitate virtualization.

Transferring control of the physical CPU between VMX root operation and VMX non-root operation is called a VMX transition. There are two kinds of VMX transitions, VM entries and VM exits. VM entries transfer physical CPU control from VMX root operation (hypervisor) to VMX non-root operation (VM). VM exits transfer physical CPU control from VMX non-root operation (VM) to VMX root operation (hypervisor). A VM exit is a hardware event that is triggered in response to a hardware condition, for instance a VMX non-root operation causes a page protection fault. The page protection fault triggers a VM exit that transfers CPU control to the hypervisor so that the hardware event may be handled by the hypervisor, which has full control over the physical CPU.

In many virtualization environments, the hypervisor may overcommit the physical CPU by provisioning physical CPU resources to vCPUs. The total CPU resources provisioned to the vCPUs may add up to an amount that is greater than the amount of physical CPU resources available on the host. This may occur because VMs may not utilize their entire provisioned CPU resources continuously. Depending upon vCPU usage, overcommitting CPU resources may not always impact VM performance. For example, the hypervisor may provision 4 vCPUs, each of which are allocated 50% of physical CPU resources (200% of physical CPU resources committed), thereby overcommitting the physical CPU by 100%. If each of the VMs only utilize 50% of their provisioned CPU resources, then the average physical CPU processing load is 100% (25% for each of the four VMs) and the overcommit of physical CPU resources does not significantly impact VM performance.

If however, one or more of the provisioned VMs demand more than their average CPU resources, such as each VM demanding 80% of their provisioned 50% of CPU resources, then the required physical CPU workload would exceed the capacity of the physical CPU of the host (4×[80% of the provisioned 50% CPU resources]=160% total CPU resources needed). Exceeding physical CPU limitations of the host may result in increased latency for VM tasks. A hypervisor may halt VMs in order to transfer CPU resources from one VM task to another, may shut down VMs, or may migrate VMs to a different host in order to process the current workload.

Halting VMs in order to transfer control of CPU resources from a VM to the hypervisor may be triggered by a hardware condition that causes a VM exit of a particular VM in order to transfer control of the CPU resources to the hypervisor. However, executing a VM exit involves saving the state of control registers, debug registers, machine specific registers (MSRs), and other data related to the current processing thread being executed by the VM. Once the current processor state of the VM is saved, then the processor state of the hypervisor is loaded into the control registers, debug registers, MSRs, and other processor specific registers such that the hypervisor may complete its task. Saving the current processor state of the VM and loading another processor state involves significant processing overhead which when performed several times may result in overall performance degradation of VMs running on the host.

Conventionally, performance sensitive deployments may allocate one vCPU for each physical CPU available in order to avoid the processing overhead associated with VM exits when control of CPU resources switches between the VM and the hypervisor. However, allocating only one vCPU per physical CPU may limit the number of VMs and the number of vCPUs that can be provisioned by a hypervisor.

Accordingly, aspects of the present disclosure address the above noted deficiencies of processing overhead caused by saving and loading processing states of a VM during VM exit. Aspects of the present disclosure include the VM scheduling a balloon thread that reserves physical CPU time for host execution. The portion of CPU time to be reserved for host execution is determined by the hypervisor, which may notify the VM of the portion of CPU time that is to be reserved for host execution, such that the VM may schedule a balloon thread emulating the reserved CPU time, thus implementing a cooperative vCPU scheduling between the hypervisor and the VM. Upon receiving execution control, the balloon task may execute an instruction that causes a VM exit, such as an unconditional vmcall which when executed as a VMX non-root operation triggers an unconditional VM exit. When the VM exit is triggered, execution control of the CPU is transitioned from VMX non-root operation to VMX root operation, which is controlled by the hypervisor.

For example, the hypervisor may determine that a portion of the CPU time assigned to the VM, such as 25%, may need to be reclaimed for host execution. The hypervisor may then notify the VM of the portion (25%) that needs to be reclaimed for host execution. By notifying the VM of the portion of CPU time needed, the VM may schedule the host execution time as a balloon task or thread within the VM in order to minimize the overhead involved with a VM exit. In an implementation, upon receiving execution control of the physical CPU, the hypervisor may then execute a host task using the physical CPU. Upon execution of the host task, the hypervisor may return execution control to the VM. Execution control may be returned by executing a VM entry or a VM resume instruction.

In an implementation, the VM receiving a notification from the hypervisor of the portion of CPU time to be reserved for host execution. The VM may schedule the balloon task to be executed for a period of time, where the period of time for execution reflects the portion of CPU time included in the received notification from the hypervisor. For example, the notification from the hypervisor may specify that 25% of the CPU time assigned to the VM is to be reserved for host execution. The VM may schedule the balloon task to be executed for 250 milliseconds for every second of CPU time (25% of each second). In another example, the hypervisor may explicitly specify the period of CPU time to be reserved for host execution, such as 250 milliseconds for every second. When the VM executes the balloon task, the balloon task may initiate a VM exit in order to transfer control to the hypervisor.

In an implementation, the VM may receive execution control of the physical CPU back from the hypervisor. For example, the hypervisor may complete a VMX root operation and may then return execution control of the physical CPU to the VM. Upon receiving execution control of the physical CPU from the hypervisor, the balloon task may terminate, thus returning execution control to the guest OS scheduler, which may then start execution of other scheduled VM tasks. The balloon task may include a return instruction immediately following the instruction causing the VM exit, such that when the VM resumes execution of the balloon task, the balloon task immediately exits. Alternatively, a VM scheduler may preempt the balloon task in order to start another VM task. For example, when the VM resumes execution of the balloon task, the VM scheduler may suspend the balloon task before the next instruction in the balloon task is performed.

In an implementation, the VM may receive execution control of the vCPU from the hypervisor at a time before the balloon task is scheduled to end. For example, the balloon task may be configured to provide 100 milliseconds of CPU time back the hypervisor. If the hypervisor returns execution control back to the VM before the scheduled 100 milliseconds has elapsed, then the VM would receive execution control before the balloon task is scheduled to end. The VM may determine that the remaining time for execution of the balloon task is large enough for the hypervisor to perform another task. The VM may return execution control to the hypervisor to perform another task.

Transferring execution control of the physical CPU from the hypervisor to the VM is accomplished by executing a VM entry, such as a VM resume command. In an implementation, the hypervisor may update the CPU time to be reserved for future host execution when the hypervisor receives current execution control of the physical CPU. In an implementation, the hypervisor may receive execution control of the physical CPU for host execution of a task. The hypervisor may determine an updated portion of CPU time to be reserved for future host execution. The hypervisor may then notify the VM of the updated portion of the physical CPU to be reserved for future host execution. For example, the hypervisor notify the VM of the updated portion of the physical CPU by writing parameters that specify the updated portion of CPU time to a memory buffer, which is mapped to the VM address space, such that the VM may read the updated portion.

In another example, the hypervisor may notify the VM by writing parameters that specify the updated portion of CPU time to previously unused bits of a virtual machine control data structure (VMCS) associated with the VM. The VMCS is a data structure in memory associated with a VM that is used to manage transitions between VMX root operation and VMX non-root operation and processor behavior in VMX non-root operation. The VMCS may contain a guest-state area, host state area, VM-execution control fields, VM exit control fields, VM entry control fields, and VM exit information fields. The guest-state area may contain data describing the processor state of the VM upon a VM exit, such as data currently stored in processor registers at the time the VM exit is triggered. Upon a VM exit, data from the processor registers are saved to the guest-state area. The data from the guest-state area may be used to reload the processor state of the VM into the processor registers prior to VM entry. The host-state area may contain data describing the processor state to be loaded into the processor registers upon a VM exit. The VM-execution control fields contain data describing processor behavior during VMX non-root operation. VM exit control fields contain data describing behavior for different kinds of VM exits. The VM entry control fields contain data describing behavior for different kinds of VM entries. The VM exit information fields are used to store information related to recent VM exits. The previously unused bits may refer to bits within the VMCS that are not conventionally used for managing transitions between VMX root operation and VMX non-root operation and processor behavior in VMX non-root operation.

Upon writing the updated portion to either a memory buffer mapped to VM address space or to previously unused bits of the VMCS, the hypervisor may return execution control of the vCPU to the VM by executing a VM entry. The VM may then read the updated portion of CPU time to be reserved for host execution from either the memory buffer or the VMCS and then update the scheduling of the balloon task.

In an implementation, the updated portion of CPU time to be reserved for future host execution may be calculated based upon changes in physical CPU load from vCPUs and other VMs. For example, if a new vCPU is provisioned for either the current VM or another VM running on the host, the hypervisor may update the portion of CPU time to be reserved for future host execution by writing updated balloon task parameters to memory buffer mapped to the VM address space or to previously unused bits in the VMCS. Additionally, if a VM or vCPU has been decommissioned, then the hypervisor may update the portion of CPU time to be reserved for future host execution by writing updated balloon task parameters to memory buffer mapped to the VM address space or to previously unused bits in the VMCS.

The hypervisor may monitor whether the VM is cooperating by returning execution control of the physical CPU at the scheduled time. In an implementation, the hypervisor may notify the VM of the portion of CPU time that is to be reserved for host execution by writing to a memory buffer mapped to VM address space or by writing to previously unused bits of the VMCS. The hypervisor may receive execution control from the VM and may detect that the VM exceeded its allocated timeslot for VM execution based upon when execution control was received. For example, if the hypervisor expected execution control at a certain time and the VM returned execution control 500 milliseconds after the expected time, then the hypervisor may determine that the VM exceeded its allocated timeslot for VM execution by 500 milliseconds. As a result, the hypervisor may penalize the VM by reducing the allocated timeslot for VM execution by increasing the portion of CPU time that is to be reserved for host execution. For example, the hypervisor may notify the VM of the updated portion of CPU time that is to be reserved for host execution, where the updated portion of CPU time has increased by 500 milliseconds.

In an implementation, if the VM continues to exceed its allocated timeslot for VM execution by not returning execution control to the hypervisor at the scheduled time, the hypervisor may further penalize the VM by further reducing the allocated timeslot for VM execution. Additionally, the hypervisor may interrupt the VM if repeated violations occur. For example, the hypervisor may trigger an external interrupt to cause a VM exit in order to transfer execution control from the VM to the hypervisor. Interrupting or shutting down the VM may be useful if the reason for not returning execution control of the physical CPU to the hypervisor is based upon the VM crashing or having other unexpected errors that may require a reboot.

FIG. 1 depicts a high-level component diagram of an illustrative example of a host computer system, in accordance with one or more aspects of the present disclosure. Other architectures for host system 100 are possible, and implementation of a computer system utilizing examples of the present disclosure is not limited to the specific architecture depicted by FIG. 1.

As shown in FIG. 1, the host system 100 is connected to a network 150 and comprises one or more physical CPUs 160-1 through 160-N, where N is a positive integer, main memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect (PCI) solid state drive, a Redundant Array of Independent Disks (RAID) system, a network attached storage (NAS) array, etc.), and one or more devices 190 (e.g., a Peripheral Component Interconnect (PCI) device, network interface controller (NIC), a video card, an I/O device, etc.). In certain implementations, main memory 170 may be non-uniform access (NUMA), such that memory access time depends on the memory location relative to CPU 160-1 through 160-N. It should be noted that although, for simplicity, a single CPU 160, storage device 180, and device 190 are depicted in FIG. 1, other implementations of computer system 100 may comprise a plurality of CPUs, storage devices, and devices.

Host system 100 may additionally comprise a VM 130 and hypervisor 125. VM 130 may be a virtual machine emulating an operating system such as Windows or Linux that executes programs as though it was a physical machine. In some implementations, hypervisor 125 may include a component (called a host operating system (OS) 120) that manages the hardware resources of the computer system and provides functions such as inter-process communication, scheduling, memory management, and so forth. It should be noted that in some alternative implementations, hypervisor 125 may be embedded within host OS 120, rather than host OS 120 being embedded within hypervisor 125, or may replace host OS 120.

VM 130 may comprise a guest operating system (OS) 135 and vCPUs 131-1 through 131-K, where K is a positive integer. Guest OS 135 may handle the execution of applications 133 within the virtual machine. The vCPUs 131-1 through 131-K may be used by guest OS 135 to handle the execution of application threads associated with applications 133, as well as for guest OS functions within VM 130. An application thread may be a sequence of programmed instructions that can be managed independently by a guest scheduler 138 within the guest OS 135. An application thread can be a component of a process executing within guest OS 135. The guest scheduler 138 may schedule the application threads and other guest OS threads for execution on the vCPUs 131-1 through 131-N. It should be noted that although, for simplicity, a single VM 130 is depicted in FIG. 1, computer system 100 may host a plurality of VMs 130.

Each vCPU 131 is a component that emulates a physical CPU, and is mapped to one of CPUs 160. In some implementations, hypervisor 125 manages mappings between vCPUs 131 and CPUs 160 in a transparent fashion, so that guest OS 135 and applications 133 executing on VM 130 interact with vCPUs 131 as though they were actual physical processors.

The guest OS 135 may receive a notification from the hypervisor 125 to schedule a balloon task for a period of time specified by the hypervisor 125. The notification may represent scheduling parameters for the balloon task written to a memory buffer mapped to the VM address space or written to previously unused bits of the VMCS. The parameters for the balloon task may indicate a portion of CPU time of the vCPU 131 that is to be assigned to the balloon task. The balloon task may include a thread and may be scheduled by the guest scheduler 138. The portion of CPU time indicated within the notification from the hypervisor 125 may specify the portion in terms of a percentage of the total CPU time assigned to the vCPU 131. For example, the notification may specify that 40% of the portion of CPU time assigned to vCPU 131 (40% of the vCPU) is to be scheduled for the balloon task. In other implementations, the notification may specify a specific period of time, such as 100 milliseconds of every second is to be scheduled for the balloon task.

The balloon task may be configured to include instructions to trigger a VM exit for transferring the execution control back to the hypervisor 125. For instance, the balloon task may include a VMX non-root operation that would trigger a VM exit command to return execution control back to the hypervisor 125. The VM exits may be triggered by HLT, a vmcall, or any other VMX non-root instruction that triggers either a unconditional VM exit or a conditional VM exit. The VM exit triggered instruction may be followed by a return instruction, which would be executed when the VM 130 receives execution control back from the hypervisor 125. For example, after the hypervisor 125 executes a task and returns execution control back to the VM 130, the guest OS 135 resumes the balloon task. The balloon task may include instructions that specify the VMX non-root operation that triggers the VM exit and a return command (RET). When the guest OS 135 resumes the balloon task, the guest OS 135 executes the RET, which returns control back to the kernel of the guest OS 135.

Figure 2A:
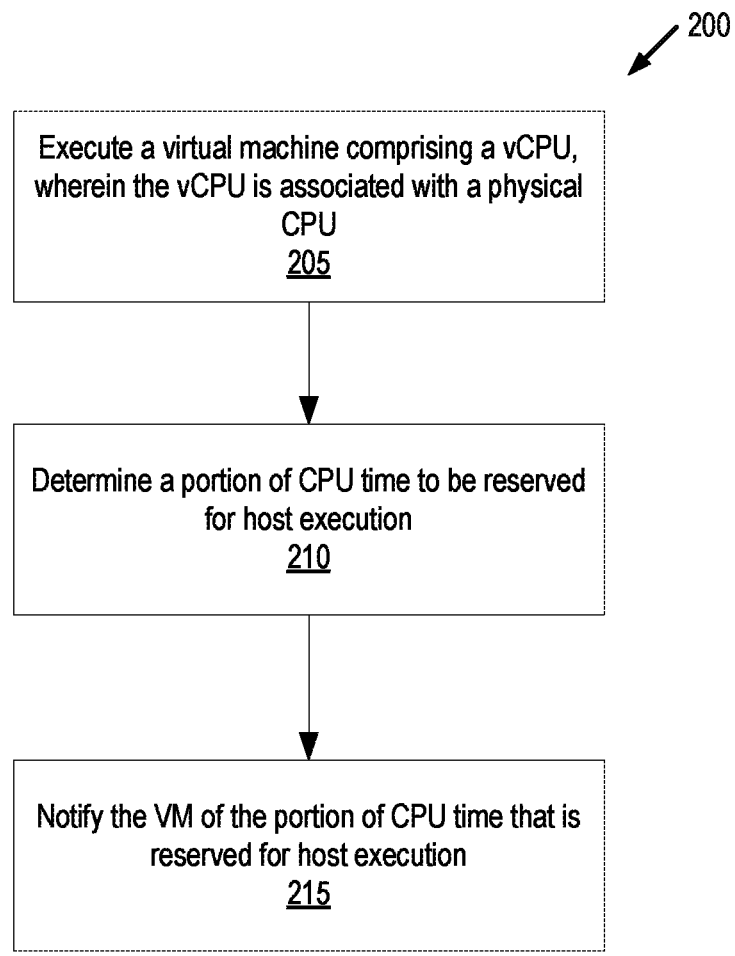
FIG. 2A depicts a flow diagram of an example method for notifying a virtual machine of a portion of central processing unit time that is to be reserved for host execution.
Figure 4:
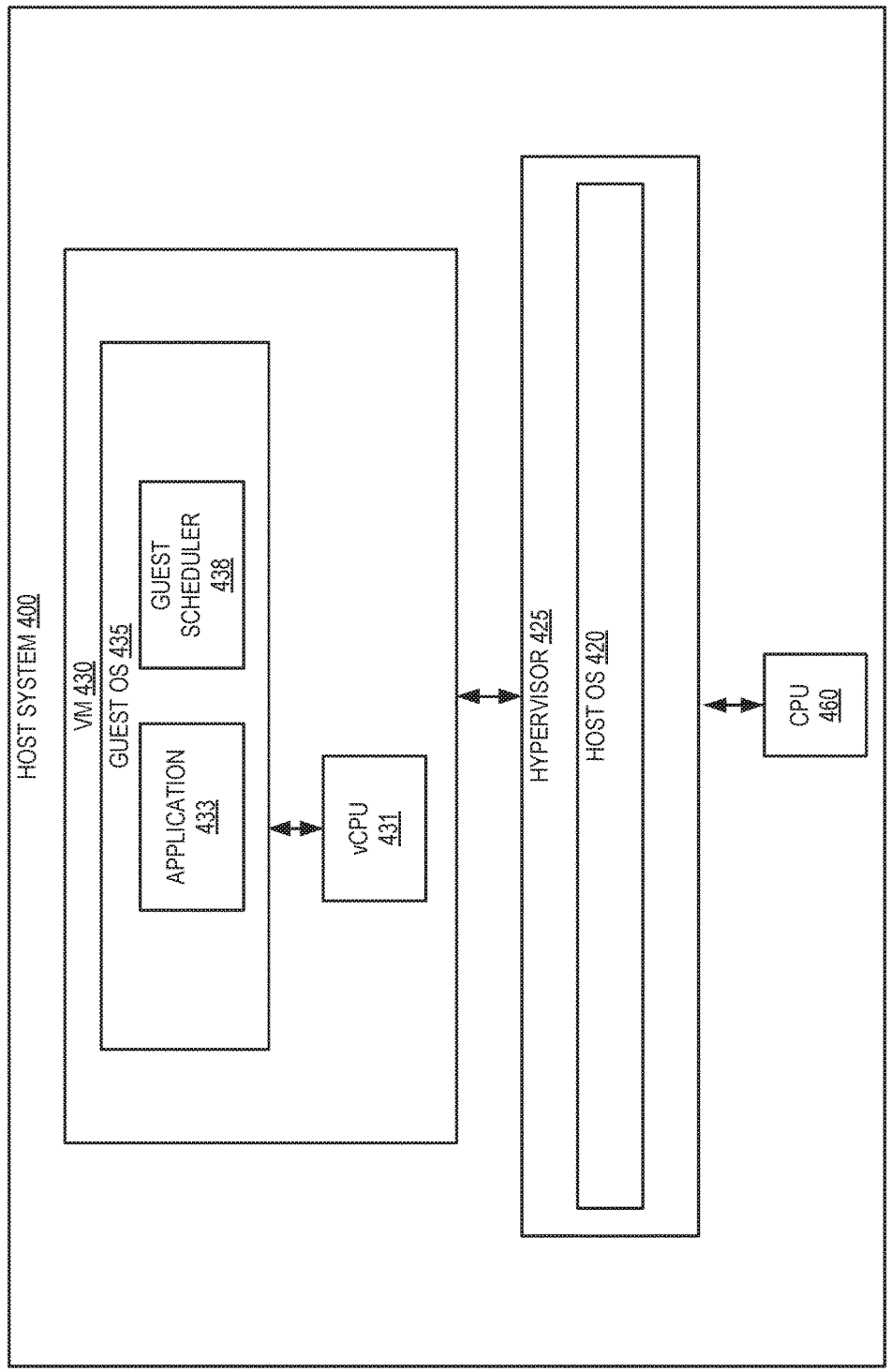
FIG. 4 depicts a block diagram of an illustrative example of a computer system, in accordance with one or more aspects of the present disclosure.

FIG. 2A depicts a flow diagram of an example method 200 for notifying a VM of a portion of CPU time that is to be reserved for host execution. The method may be performed by processing logic that may comprise hardware (circuitry, dedicated logic, etc.), computer readable instructions (run on a general purpose computer system or a dedicated machine), or a combination of both. FIG. 4 depicts a block diagram of an example host system 400 for performing method 200. Host system 400 may be the same or similar to the computer system 100 of FIG. 1. In the example shown, host system 400 includes VM 430, guest OS 435, application 433, guest scheduler 438, vCPU 431, hypervisor 425, host OS 420, and CPU 460. In one illustrative example, method 200 may be performed by hypervisor 425. Alternatively, some or all of method 200 might be performed by other modules or machines.

At block 205, processing logic enters or resumes execution of a virtual machine (VM 430) comprising a vCPU 431. The vCPU 431 is associated with the physical CPU 460. In an implementation, hypervisor 425, running within computer system 400, executes VM 430 by executing a VM entry with either VM LAUNCH or VM RESUME instructions. VM LAUNCH instruction may be used by the hypervisor 425 to launch the VM 430. If the VM 430 is in a launched state and was previously halted by the hypervisor 425, then the hypervisor may resume execution of the VM 430 using VM entry and VM RESUME instructions. In other implementations, the hypervisor 425 may execute the VM 430 using any other available VM instructions to initiate execution of the VM 430.

In an implementation, prior to executing the VM 430, the hypervisor 425 may configure CPU time of the physical CPU 460 and map the CPU time to the vCPU 431 of VM 430. The CPU time assigned to vCPU 431 may represent a number of time slots of physical CPU 460 measured as a percentage of the total time slots of physical CPU 460. For example, hypervisor 425 may assign 50% of the timeslots of physical CPU 460 to vCPU 431, thereby assigning half of the physical CPU 460 resources to vCPU 431 of VM 430.

At block 210, processing logic determines a portion of CPU time to be reserved for host execution. In an implementation, hypervisor 425 determines a portion of the CPU time assigned to vCPU 431 that is to be reserved for host execution. Host execution refers to execution of a process controlled by hypervisor 425 on physical CPU 460 or any other processing not specifically reserved for vCPU 431. Execution of the process may be performed by the hypervisor 425 or the host OS 420. For example, a kernel module within host OS 420 may perform tasks for the host system 400. Additionally, the process executed by the hypervisor 425 may include executing task associated with another VM.

In an implementation, the portion of CPU time to be reserved for host execution may be calculated as a percentage of the timeslots of the physical CPU 460 assigned to vCPU 431 of VM 430. For example, the hypervisor 425 may determine that 25% of the CPU time assigned to VM 430 is to be reserved for host execution. In another implementation, the hypervisor may determine a period of time that is to be reserved for host execution. For example, the hypervisor 425 may determine that every 100 milliseconds of every second assigned to the VM 430 is to be reserved for host execution.

At block 215, processing logic notifies the VM 430 of the portion of CPU time that is reserved for host execution. In an implementation, the hypervisor 425 notifies the VM 430 by performing a VM exit to halt the VM 430 and then writing scheduling parameters for the portion of CPU time that is to be reserved for host execution to a memory buffer mapped to VM address space. Alternatively, the hypervisor 425 may write the scheduling parameters to previously unused bits of the VMCS. The instructions may include instructions to schedule a balloon task, such as a balloon thread, for the amount of CPU time specified by the reserved portion of CPU time.

In an implementation, the scheduling parameters written to the memory buffer may specify a portion of time that includes the portion of CPU time reserved for host execution and additional CPU time needed for to transferring execution control between the VM 430 and the hypervisor 425. For example, if the hypervisor determines that the host system 400 requires 100 milliseconds of host system execution time, then the VM entry may specify a time greater than 100 milliseconds, such as 104 milliseconds, where the additional 4 milliseconds may account for overhead time attributed to transferring execution control between the VM 430 and the hypervisor 425 during VM exit and VM entry.

Figure 2B:
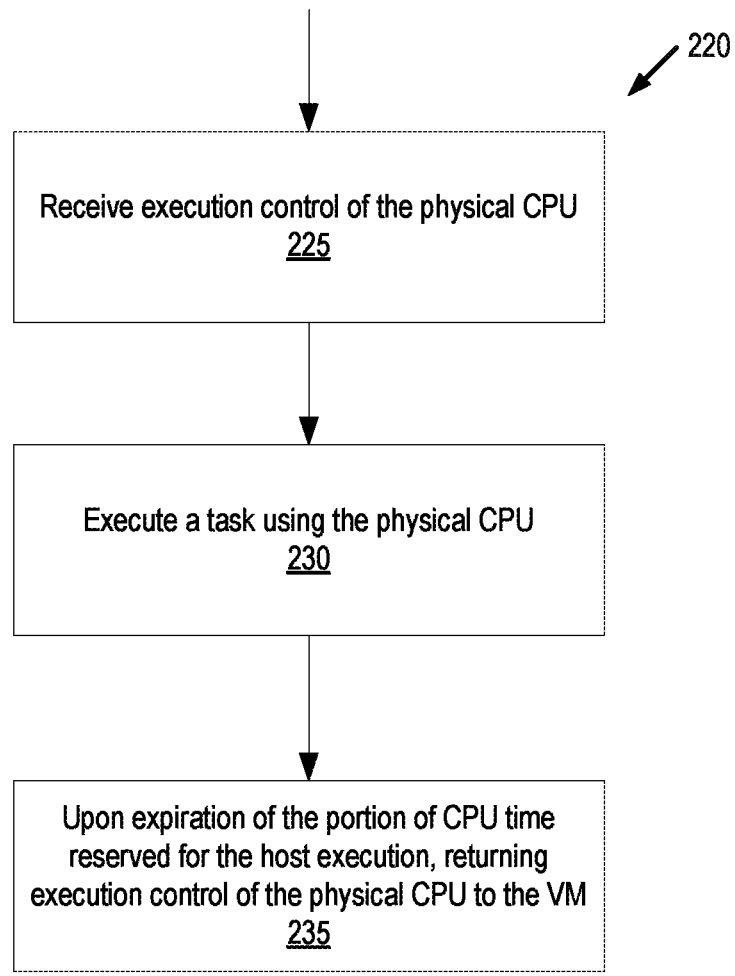
FIG. 2B depicts a flow diagram of an example method of the hypervisor receiving execution control from the virtual machine for host execution of a task.

Upon notifying the VM 430 of the portion of CPU time that is to be reserved for host execution, the VM 430 may schedule the balloon task to transfer execution control back to the hypervisor 425. The balloon task may include a sequence of instructions, such as an instruction that triggers a VM exit and another instruction to exit the balloon task. The VM exit may be either an unconditional VM exit or a conditional VM exit. An unconditional VM exit transfers execution control to the hypervisor 425 regardless of the conditions for the VM exit. For example, the balloon task may include a VMX non-root operation such as a vmcall, GETSEC, INVD or XSETBV, which may cause an unconditional VM exit. A conditional VM exit refers to a VMX non-root operation that may trigger a VM exit based upon settings within the VM-execution controls. For example, the balloon task may include a VMX non-root operation, such as a HLT command, that may cause a conditional VM exit if the "HLT exiting" VM-execution control is set to "1". Following the instruction that causes the VM exit, the balloon task may include a RET command that causes the balloon task to exit. FIG. 2B depicts a flow diagram of an example method 220 of the hypervisor receiving execution control from the VM for host execution of a task. The method may be performed by processing logic that may comprise hardware (circuitry, dedicated logic, etc.), computer readable instructions (run on a general purpose computer system or a dedicated machine), or a combination of both. FIG. 4 depicts a block diagram of an example host system 400 for performing method 220.

At block 225, processing logic receives execution control of the physical CPU 460. In an implementation, the hypervisor 425 receives execution control of physical CPU 460 from VM 430 via VM exit which is triggered by the balloon task executing a VMX non-root instruction that causes a VM exit to transfer execution control to the hypervisor 425.

At block 230, processing logic executes a task using the physical CPU. In an implementation, the hypervisor 425 or host OS 420 may execute a host system 400 task using physical CPU 460. The task executed may be a hypervisor specific task, such as provisioning a VM or other resources, backing up a VM, or any other hypervisor specific task, or performing a host system 400 specific task. In other examples, the hypervisor 425 may provide the received CPU time of physical CPU 460 to another VM or another vCPU to perform a task.

At block 235, processing logic returns execution control of the physical CPU back to the VM. In an implementation, upon expiration of the portion of CPU time reserved for host execution, the hypervisor 430 returns execution control of physical CPU 460 back to VM 430 by executing VM RESUME instruction. In another implementation, if the hypervisor 425 completes the task before the allotted CPU time reserved for the task is complete, then the hypervisor 425 may return execution control of the physical CPU 460 back to VM 430.

Figure 3A:
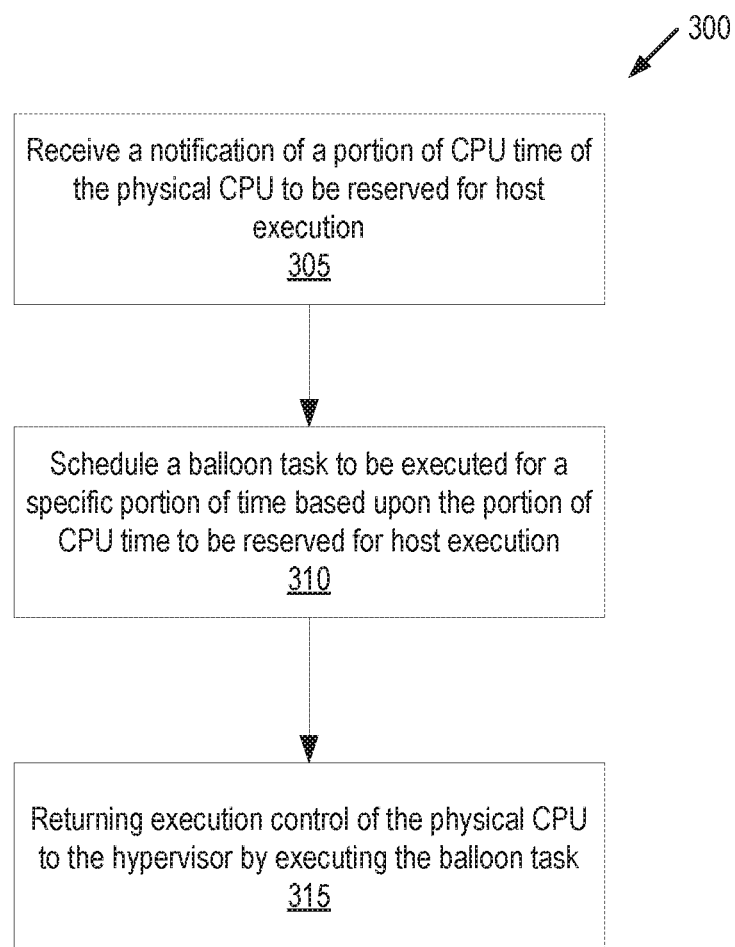
FIG. 3A depicts a flow diagram of an example method of a virtual machine receiving a notification of a portion of central processing unit time that is to be reserved for host execution, scheduling a balloon task that represents the reserved central processing unit time, and executing the balloon task.

FIG. 3A depicts a flow diagram of an example method 300 of a VM receiving a notification of a portion of CPU time that is to be reserved for host execution, scheduling a balloon task that represents the reserved CPU time, and executing the balloon task. The method may be performed by processing logic that may comprise hardware (circuitry, dedicated logic, etc.), computer readable instructions (run on a general purpose computer system or a dedicated machine), or a combination of both. FIG. 4 depicts a block diagram of an example host system 400 for performing method 300.

At block 305, processing logic receives a notification of a portion of CPU time of the physical CPU to be reserved for host execution. In an implementation, VM 430 receives, from hypervisor 425, a notification of a portion of CPU time of physical CPU 460 to be reserved for host execution. The notification may be scheduling parameters written to a memory buffer mapped to the VM address space or scheduling parameters written to previously unused bits of the VMCS.

At block 310, processing logic schedules a balloon task to be executed for a specific portion of time based upon the portion of CPU time to be reserved for host execution from the notification received from the hypervisor 425. In an implementation, the balloon task may represent a simple task configured to transfer execution control to the hypervisor 425 when executed. The hypervisor 425 may execute a VM entry to transfer processing control of the vCPU to the VM 430. The guest scheduler 438 of VM 430 may schedule the balloon task to be run on the vCPU 431. The balloon task may be scheduled to run for the specific period of time corresponding to the portion of CPU time to be reserved for host execution. For example, if the portion of CPU time reserved for host execution specifies a percentage of CPU time such as 50%, then the guest scheduler may schedule the balloon task to run on the vCPU 431 for 50% of the time. In another example, if the portion of CPU time reserved for host execution specifies a period of time, such as 100 milliseconds out of every second, then the guest scheduler may schedule the balloon task to run on the vCPU 431 for a period of 100 milliseconds for every second.

At block 315, processing logic returns execution control of the physical CPU to the hypervisor by executing an operation within the balloon task that triggers a VM exit. In an implementation, VM 430 returns execution control of the CPU 460 to the hypervisor 425 by executing instructions contained in the balloon task. For example, the balloon task may include a VMX non-root operation which triggers a VM exit to cause VM 430 to return execution control to the hypervisor 425.

The VM exit is may trigger steps for saving the processor state of the VM. For example, upon triggering a VM exit, the processor state of the VM, including the state of control registers, debug registers, MSRs, and other data related to the current processing thread may be stored into fields of the guest-state area of the VMCS, where the different fields represent different processor registers. In an implementation, since the balloon task's purpose is to act as a placeholder for host execution of tasks on the physical CPU 461, the processor state of the VM may include a limited data. For instance, control registers, debug registers, and MSRs may contain little or no data such that the processing overhead for the VM exit and subsequent VM entry is reduced.

Figure 3B:
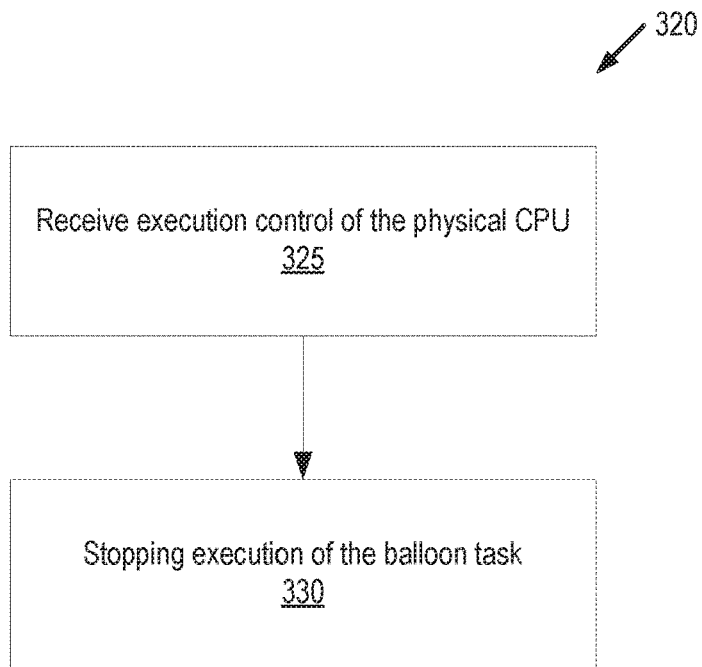
FIG. 3B depicts a flow diagram of an example method of a virtual machine receiving execution control back from the hypervisor and stopping execution of a balloon task.

The VM 430 may receive execution control back from the hypervisor 425. FIG. 3B depicts a flow diagram of an example method 320 of the VM receiving execution control back from the hypervisor and stopping execution of the balloon task. The method may be performed by processing logic that may comprise hardware (circuitry, dedicated logic, etc.), computer readable instructions (run on a general purpose computer system or a dedicated machine), or a combination of both. FIG. 4 depicts a block diagram of an example host system 400 for performing method 320.

At block 325, processing logic receives execution control of vCPU from the hypervisor. In an implementation, VM 430 receives execution control of the vCPU from the hypervisor 425 via a VM resume.

At block 330, processing logic stops execution of the balloon task. In an implementation, upon receiving the execution control via the VM resume command, the VM 430 stops execution of the balloon task. The balloon task may include an instruction that, upon resuming the VM 430, returns control of the vCPU 431 back to VM 430. Alternatively, upon resuming the VM 430, the guest scheduler 438 may exit the balloon task.

Figure 3C:
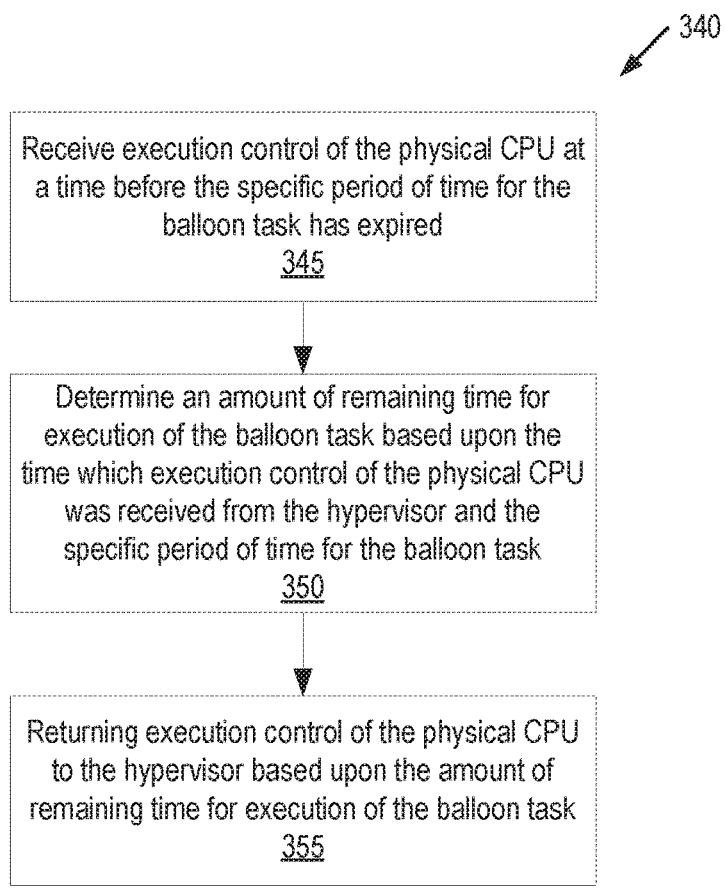
FIG. 3C depicts a flow diagram of an example method of the virtual machine receiving execution control back from the hypervisor at a time before the balloon task is scheduled to end.

In an implementation, the hypervisor 425 may return execution control to VM 430 at a time before the scheduled period of time of the balloon task has expired. This may occur if the task performed by the hypervisor 425 takes less time than expected. FIG. 3C depicts a flow diagram of an example method 340 of the VM receiving execution control back from the hypervisor at a time before the balloon task is scheduled to end. The method may be performed by processing logic that may comprise hardware (circuitry, dedicated logic, etc.), computer readable instructions (run on a general purpose computer system or a dedicated machine), or a combination of both. FIG. 4 depicts a block diagram of an example host system 400 for performing method 340.

At block 345, processing logic receives execution control of the physical CPU from the hypervisor at a time before the balloon task is scheduled to end. In an implementation, VM 430 receives execution control of the physical CPU from the hypervisor 425 via a VM resume at the time before the balloon task is scheduled to end.

At block 350, processing logic determines an amount of remaining time for executing the balloon task based upon the time scheduled for execution of the balloon task and the time at which execution control was received. In an implementation, the guest scheduler 438 determines the amount of time remaining for the balloon task by subtracting the amount of time the hypervisor had execution control of the physical CPU 460 from the specific amount of time allotted for the scheduled balloon task. For example, if the balloon task was scheduled to be performed in 100 milliseconds, and based upon when execution control was received back from the hypervisor 425, then the guest scheduler 438 may determine that the hypervisor 425 only used 60 milliseconds of the scheduled 100 milliseconds for the balloon task. If the guest scheduler 438 determines that a significant amount of time still remains for executing the balloon task, then the guest scheduler 438 may schedule another balloon task to be run within the remaining time left.

At block 355, processing logic returns execution of the physical CPU to the hypervisor based upon the amount of time remaining for executing of the balloon task. In an implementation, VM 430 may return execution control of physical CPU 460 to the hypervisor 425 via a VM exit.

In another implementation, at block 350 the guest scheduler 438 may determine that the amount of time remaining for execution of the balloon task is too short to return execution control of the physical CPU 460 to the hypervisor 425. Upon determining that there is not enough time remaining within the balloon task, the guest scheduler 438 may stop execution of the balloon task and may start other VM 430 tasks.

Figure 5:
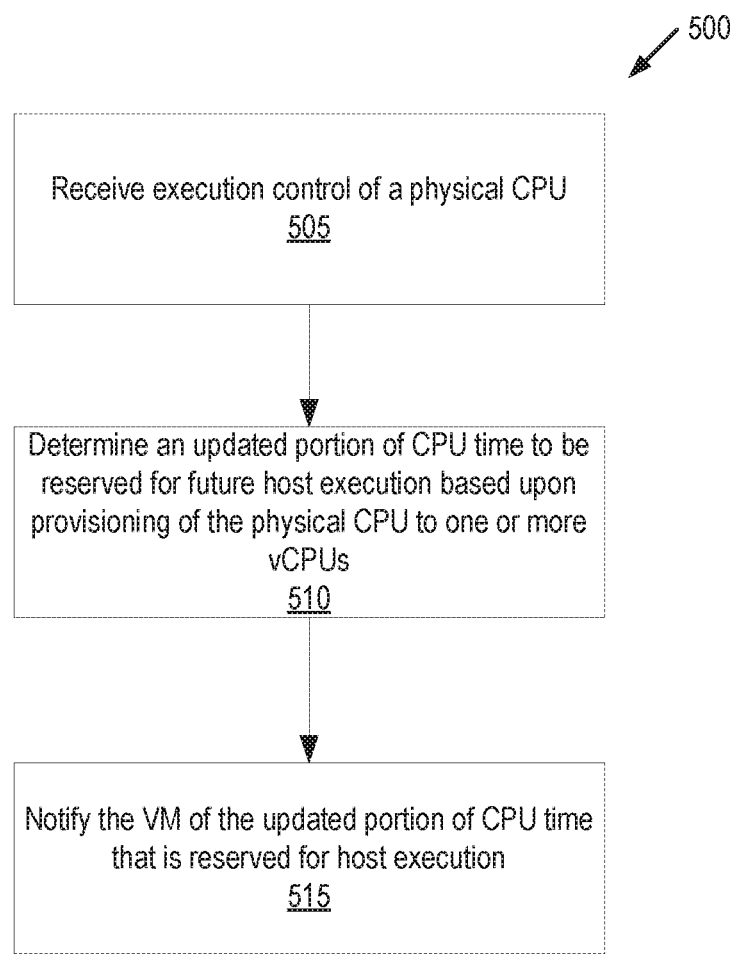
FIG. 5 depicts a flow diagram of an example method updating a portion of central processing unit time that is to be reserved for host execution and notifying the virtual machine of the updated portion.
Figure 6:
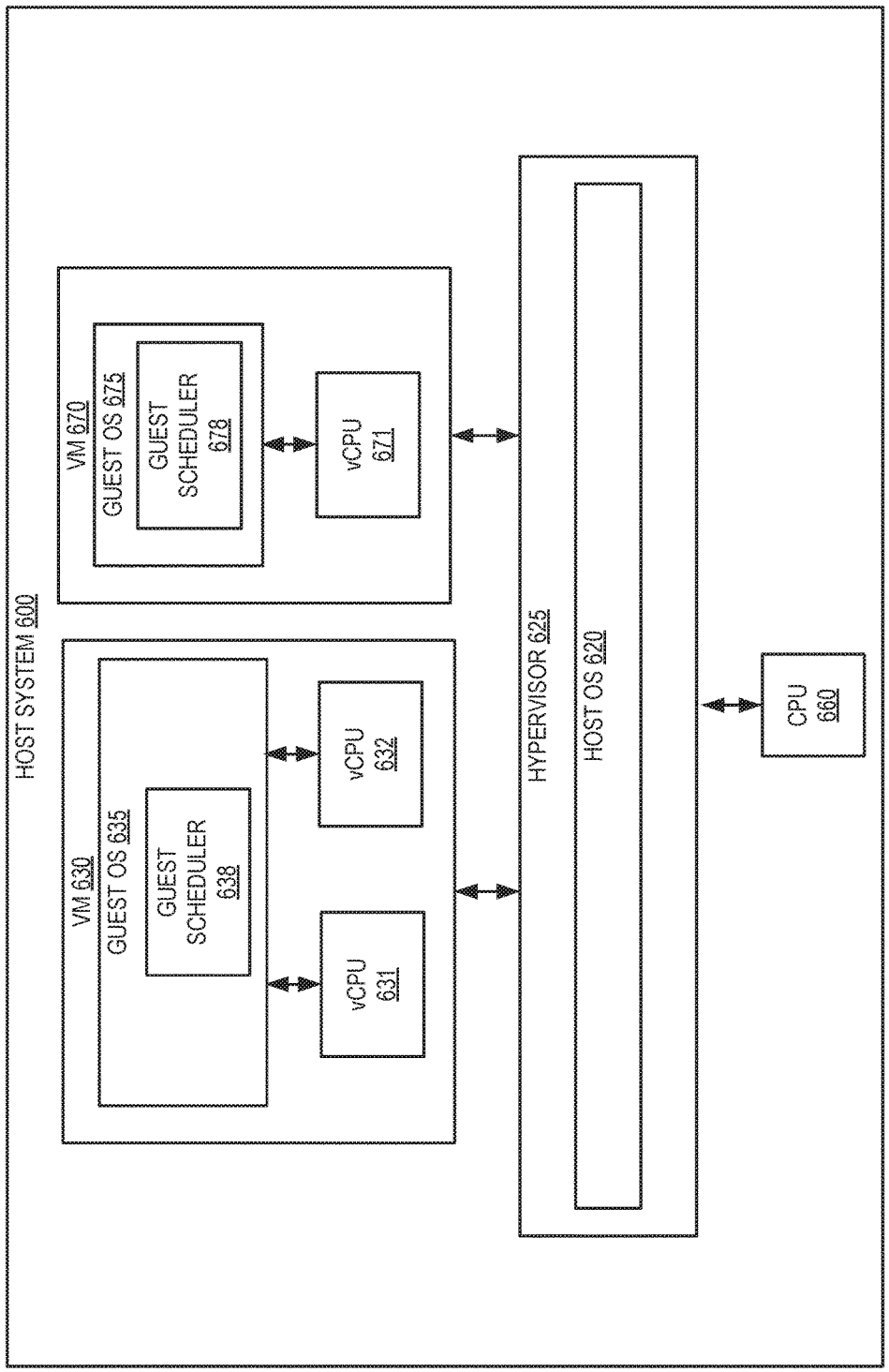
FIG. 6 depicts a block diagram of an illustrative example of a computer system, in accordance with one or more aspects of the present disclosure.

FIG. 5 depicts a flow diagram of an example method 500 updating a portion of CPU time that is to be reserved for host execution and notifying the VM of the updated portion. The method may be performed by processing logic that may comprise hardware (circuitry, dedicated logic, etc.), computer readable instructions (run on a general purpose computer system or a dedicated machine), or a combination of both. FIG. 6 depicts a block diagram of an example host system 600 for performing method 500. Host system 600 may be the same or similar to the computer system 100 of FIG. 1. In the example shown, host system 600 includes VM 630, guest OS 635, guest scheduler 638, vCPU 631, vCPU 632, VM 670, guest OS 675, guest scheduler 678, vCPU 671, hypervisor 625, host OS 620, and CPU 660. In one illustrative example, method 500 may be performed by hypervisor 625. Alternatively, some or all of method 500 might be performed by other modules or machines.

At block 505, processing logic receives execution control of a physical CPU. In an implementation, hypervisor 625 running on host system 600 receives, from VM 630, execution control of physical CPU 660 via a VM exit. The hypervisor 625 may detect that it received execution control by a VM exit that was caused by VM 630. The VM exit may be triggered by an operation in a balloon task that was configured to provide execution control of physical CPU 660 for a portion of CPU time. The portion of CPU time may have been based upon a prior notification from the hypervisor 625 instructing the VM 630 to return execution control of the physical CPU 660 for the portion of time. In an implementation, upon receiving execution control of the physical CPU 660, the hypervisor 625 may execute a task on the physical CPU 660. Alternatively, the host OS 620 may be configured to execute a task for the host system 600 using physical CPU 660.

Processing load on physical CPU 660 may fluctuate based on an increase in processing demand or decrease in processing demand. The fluctuations may be based upon addition or deletion of vCPUs and/or VMs. At block 510, processing logic determines an updated portion of CPU time to be reserved for future host execution based upon provisioning of the physical CPU to one or more vCPUs. In an implementation, hypervisor 625 determines the updated portion of CPU time of physical CPU 660 to be reserved for future host execution based upon current demands of physical CPU 660. For example, vCPU 632 may represent a newly provisioned vCPU for VM 630. As a result, hypervisor 625 may detect an increased load on physical CPU 660 caused by the newly provisioned vCPU 632. The hypervisor 625 may detect the increased load based upon increased wait time of processes or an increased need to interrupt currently running VMs. As a result, hypervisor 625 may increase the portion of CPU time of physical CPU 660 to be reserved for future host execution.

Alternatively, hypervisor 625 may detect a decreased load on physical CPU 660 caused by a decommissioning of a vCPU and/or VM, such as vCPU 632. The hypervisor 625 may detect the decreased load based upon a decrease in wait times of processes or by detecting decreased usage of physical CPU 660. As a result, hypervisor 625 may decrease the portion of CPU time of physical CPU 660 to be reserved for future host execution.

At block 515, processing logic notifies the VM of the updated portion of CPU time that is to be reserved for future host execution. In an implementation, the hypervisor 625 notifies the VM 630 by writing scheduling parameters for the updated portion of CPU time that is to be reserved for future host execution to either a memory buffer mapped to the VM address space or to previously unused bits of the VMCS. The hypervisor 625 may then perform a VM resume to return execution control back to VM 630.

In an implementation, the hypervisor may determine a second portion of CPU time to be reserved for future host execution, where the second portion of CPU time is directed to an another vCPU that has been provisioned for VM 630. For example, if VM 630 has a newly provisioned vCPU 632, then the hypervisor may determine the second portion of CPU time to be reserved for host execution from the CPU time provisioned for vCPU 632. In an implementation, hypervisor 625 may include in the notification of block 515, scheduling parameters for the second portion of CPU time to be reserved. Alternatively, the hypervisor 625 may send a second notification to VM 630 that includes the second portion of CPU time to be reserved. In yet another implementation, if the second portion of CPU time to be reserved is based upon vCPU 671 of VM 670, then hypervisor 625 may notify VM 670 of the second portion of CPU time to be reserved for future host execution.

Figure 7:
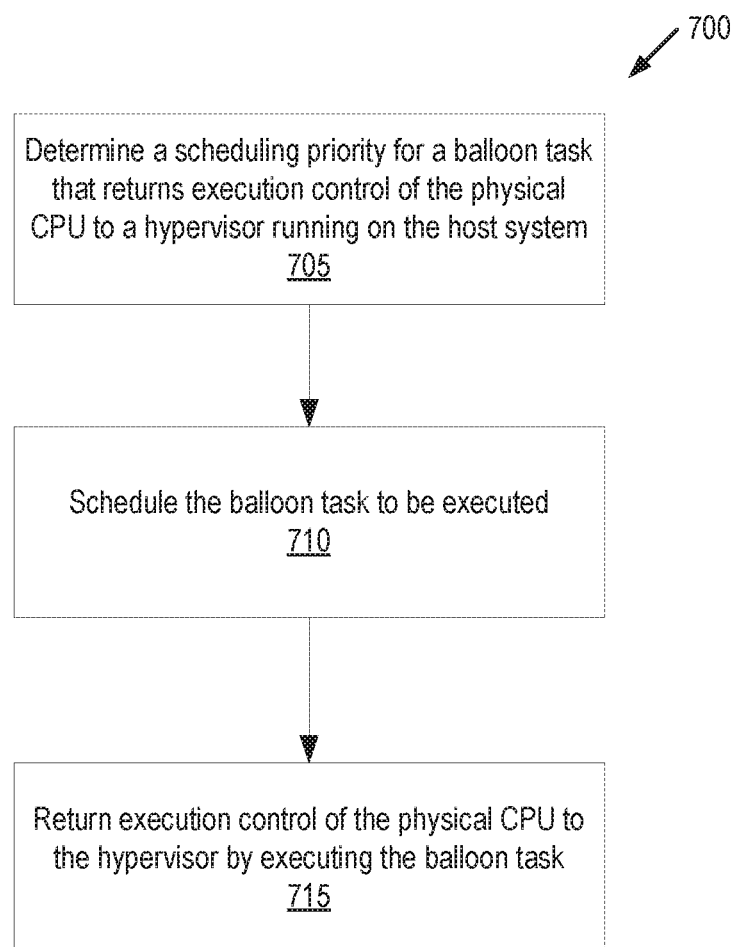
FIG. 7 depicts a flow diagram of an example method of a virtual machine scheduling a balloon task that represents a portion of central processing unit time that is to be reserved for host execution and executing the balloon task.

FIG. 7 depicts a flow diagram of an example method 700 of a VM scheduling a balloon task that represents a portion of CPU time that is to be reserved for host execution and executing the balloon task. The method may be performed by processing logic that may comprise hardware (circuitry, dedicated logic, etc.), computer readable instructions (run on a general purpose computer system or a dedicated machine), or a combination of both. FIG. 4 depicts a block diagram of an example host system 400 for performing method 700.

In an implementation, VM 430 may be configured by hypervisor 425 to include vCPU 431, where configuration of vCPU 431 may be provisioned a portion of physical CPU 460. The configuration for VM 430 may also include configuration parameters for scheduling a balloon task that is configured to, when executed, transfer execution control of physical CPU 460 from VM 430 to hypervisor 425 for host execution of a task. The configuration parameters for the balloon task may be provided to VM 430 as part of a VM launch command. In other implementations, the balloon task configuration parameters may be provided by other notifications.

At block 705, processing logic determines a scheduling priority for the balloon task. In an implementation, the guest scheduler 438 may determine the scheduling priority based upon the configuration parameters, such as the portion of time to be reserved for host execution and/or any other priority information provided. At block 710, processing logic schedules the balloon task to be executed according to the scheduling priority. For example, the guest scheduler 438 may schedule a specific portion of time based upon the portion of CPU time to be reserved for host execution.

At block 715, processing logic returns execution control of the physical CPU to the hypervisor by executing an operation in the balloon task that triggers a VM exit. In an implementation, VM 430 returns execution control of the CPU 460 to the hypervisor 425 by executing instructions contained in the balloon task. For instance, the balloon task may include instructions that trigger a VM exit which causes VM 430 to return execution control to the hypervisor 425.

Figure 8:
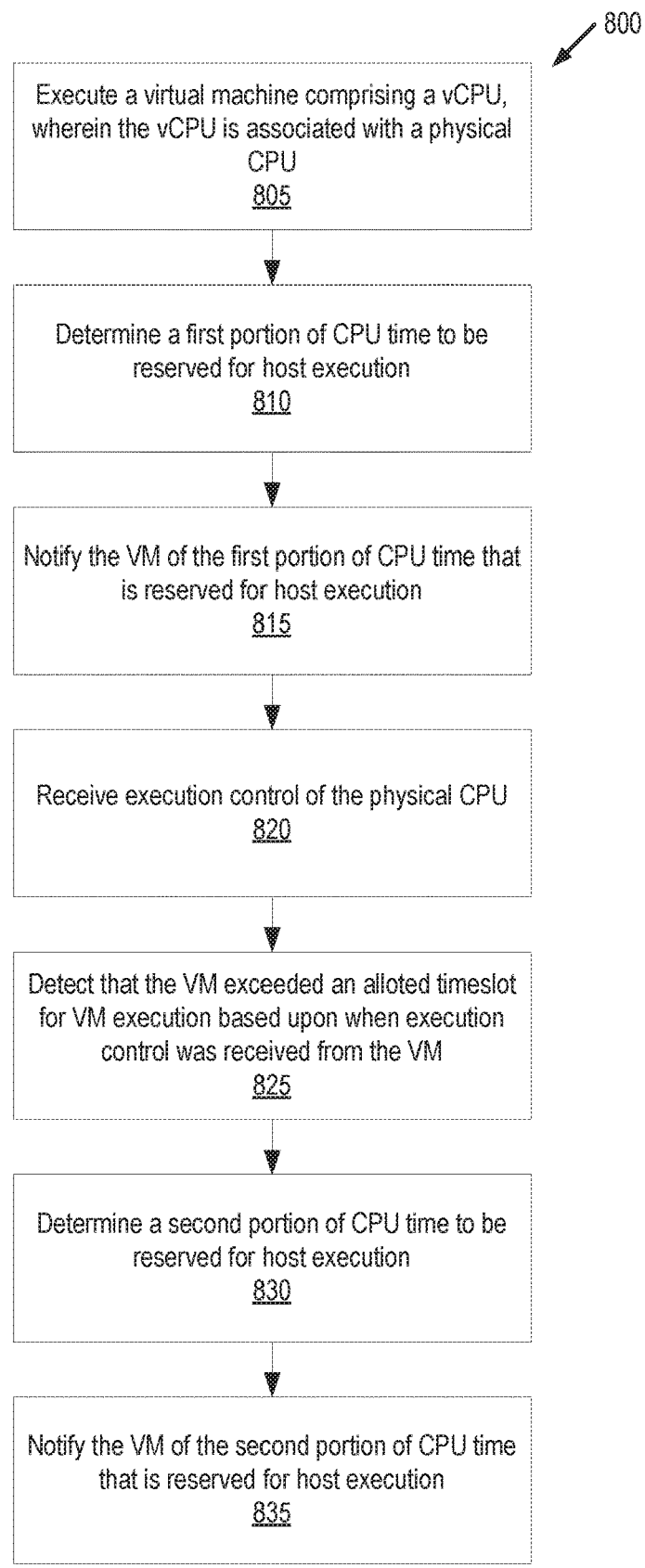
FIG. 8 depicts a flow diagram of an example method for determining whether a virtual machine is cooperating by returning execution control of the physical central processing unit for the portion of central processing unit time that is reserved for host execution.

In an implementation, if the VM does not cooperate by returning execution control of the physical CPU to the hypervisor at the time scheduled, the hypervisor may penalize the VM by reducing the CPU time allocated to the VM. By not cooperating, scheduling of host executions may be adversely affected and as a result computing performance of the hypervisor and VMs may be degraded. FIG. 8 depicts a flow diagram of an example method 800 for determining whether a VM is cooperating by returning execution control of the physical CPU for the portion of CPU time that is reserved for host execution. The method may be performed by processing logic that may comprise hardware (circuitry, dedicated logic, etc.), computer readable instructions (run on a general purpose computer system or a dedicated machine), or a combination of both. FIG. 4 depicts a block diagram of an example host system 400 for performing method 800.

At block 805, processing logic executes VM 430 comprising a vCPU 431. In an implementation, hypervisor 425, running within host system 400, executes VM 430 by executing either a VM launch or VM resume. At block 810, processing logic determines a first portion of CPU time to be reserved for host execution. In an implementation, hypervisor 425 determines the first portion of the CPU time to be reserved for host execution. At block 815, processing logic notifies the VM 430 of the portion of CPU time that is reserved for host execution. In an implementation, the hypervisor 425 notifies the VM 430 by triggering a VM exit to halt the VM 430 and then writing scheduling parameters for the portion of CPU time that is to be reserved for host execution to either memory buffer mapped to VM address space or to previously unused bits of the VMCS associated with the VM 430. The hypervisor 425 then executes a VM entry that gives execution control of the vCPU 431 to the VM 430. At block 820, processing logic receives execution control of the physical CPU 460. In an implementation, the hypervisor 425 receives execution control of physical CPU 460 from VM 430 that executed a specific VMX non-root operation which triggered a VM exit.

At block 825, processing logic detects that the VM exceeded an allotted timeslot for VM execution based upon when execution control was received from the VM. The allotted timeslot for VM execution may represent the CPU time that is assigned to VM 430 based upon the original configuration of CPU time associated with vCPU 431 and the portion of CPU time to be reserved for host execution. For example, if vCPU 431 is originally provisioned to have 50% of physical CPU time (500 milliseconds of every second) and the portion of CPU time to be reserved for host execution is 50% of the CPU time provisioned to vCPU 431 (250 milliseconds of the provisioned 500 milliseconds) then the allotted timeslot for VM execution for VM 430 is the remaining 250 milliseconds. The hypervisor 425 may determine, upon receiving execution control from VM 430, that VM 430 exceeded the allotted timeslot if execution control was received after the allotted 250 millisecond window. For instance, if VM 430 returns execution control to the hypervisor at a time that indicates that VM 430 had execution control for 350 milliseconds, then VM 430 exceeded the allotted timeshare by 100 milliseconds.

At block 830, processing logic determines a second portion of CPU time to be reserved for host execution. In an implementation, the hypervisor 425 determines the second portion of CPU time to be reserved for host execution as CPU time that is greater than the first portion of CPU time based upon the amount of time exceeded by the VM. A result of increasing the portion of CPU time reserved for host execution is decreasing the allotted timeslot of VM execution for VM 430. By doing so, the hypervisor 425 penalizes the VM 430 for not returning execution control at the time scheduled. Using the previous example where the VM 430 had execution control for an additional 100 milliseconds, hypervisor 425 may set the second portion of CPU time to be 100 milliseconds greater than the first portion of CPU time.

At block 835, processing logic notifies the VM of the second portion of CPU time to be reserved for host execution. In an implementation, the hypervisor 425 notifies the VM 430 of the second portion of CPU time by triggering a VM exit to halt the VM 430 and then writing scheduling parameters for the second portion of CPU time that is to be reserved for host execution to either memory buffer mapped to VM address space or to previously unused bits of the VMCS associated with the VM 430. The hypervisor 425 then executes a VM entry that gives execution control of the vCPU 431 to the VM 430.

In an implementation, subsequent portions of CPU time to be reserved for host execution may be monitored to determine whether the VM is cooperating or not. The hypervisor 425 may receive execution control from VM 430 based upon the second portion of CPU time reserved for host execution. The hypervisor 425 may detect that VM 430 again exceeded the allotted timeslot for VM execution based upon when execution control was received from the VM 430. As a result, hypervisor 425 may determine another adjusted portion of CPU time to be reserved for host execution based upon the amount of time exceeded by VM 430. The hypervisor 425 may notify the VM 430 of the adjusted portion of CPU time by triggering a VM exit to halt the VM 430 and then writing scheduling parameters for the adjusted portion of CPU time that is to be reserved for host execution to either memory buffer mapped to VM address space or to previously unused bits of the VMCS associated with the VM 430. The hypervisor 425 then executes a VM entry that gives execution control of the vCPU 431 to the VM 430.

In another implementation, upon detecting that VM 430 again exceeded the allotted timeslot for VM execution based upon when execution control was received from the VM 430, the hypervisor 425 may interrupt VM 430 by triggering an external interrupt that causes a VM exit. The purpose of performing an interrupt may be to halt execution of VM 430 because the VM may be experiencing performance issues that may a guest administrator of VM 430 to address.

In another example, VM 430 may not return execution control to the hypervisor 430 at all. This may occur if VM 430 has become unresponsive or has crashed and a VM exit was not triggered by the VM 430. In this scenario, hypervisor 425 may not be aware of the issue. In an implementation, hypervisor 425 may generate a threshold timer that indicates a period of time when VM 430 is to return execution control back to the hypervisor 425. For example, if VM 430 is allotted a timeshare of 250 milliseconds, then the threshold timer may be set at 500 milliseconds. By setting a buffer on the threshold timer, VM 430 is still allowed to return execution control late without being interrupted by the hypervisor 425. Upon exceeding the threshold timer, hypervisor 425 may determine that VM 430 has become unresponsive. As a result, hypervisor 425 may interrupt VM 430 by triggering an external interrupt that causes a VM exit.

Figure 9:
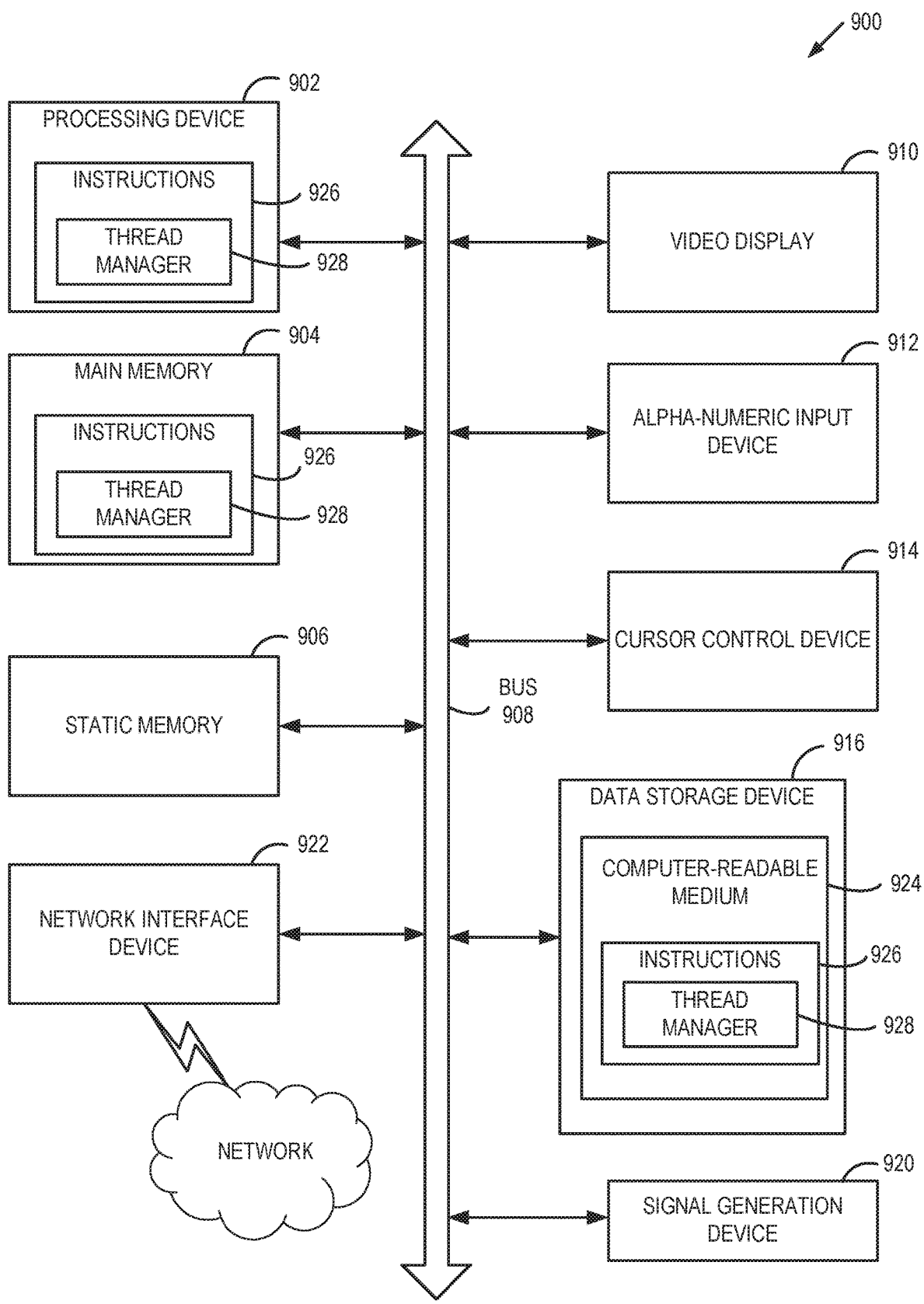
FIG. 9 depicts a block diagram of an illustrative computer system operating in accordance with embodiments of the disclosure.

FIG. 9 depicts an illustrative computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The illustrative computer system 900 includes a processing system (processor) 902, a main memory 904 (e.g., read-only memory (ROM), flash memory, dynamic random access memory (DRAM) such as synchronous DRAM (SDRAM)), a static memory 906 (e.g., flash memory, static random access memory (SRAM)), and a data storage device 916, which communicate with each other via a bus 906.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 902 may also be one or more special-purpose processing devices such as an application specific integrated circuit (ASIC), a field programmable gate array (FPGA), a digital signal processor (DSP), network processor, or the like. The processor 902 is configured to execute instructions 926 for performing the operations and steps discussed herein.

The computer system 900 may further include a network interface device 922. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker).

The data storage device 916 may include a computer-readable medium 924 on which is stored one or more sets of instructions 926 (e.g., instructions corresponding to the methods of FIGS. 2 and 3, etc.) embodying any one or more of the methodologies or functions described herein. Instructions 926 may also reside, completely or at least partially, within the main memory 904 and/or within the processor 902 during execution thereof by the computer system 900, the main memory 904 and the processor 902 also constituting computer-readable media. Instructions 926 may further be transmitted or received over a network via the network interface device 922.

While the computer-readable storage medium 924 is shown in an illustrative embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing description, numerous details have been set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "executing", "determining", "receiving", "copying", "mapping", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. In addition, embodiments of the present disclosure are not described with reference to any particular programming language. It will be appreciated that a variety of programming languages may be used to implement the teachings of the disclosure as described herein.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. Embodiments of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

Other computer system designs and configurations may also be suitable to implement the systems and methods described herein. The following examples illustrate various implementations in accordance with one or more aspects of the present disclosure.

Example 1 is a method comprising executing, by a hypervisor running on a computer system comprising a physical CPU, a virtual machine (VM) comprising a virtual central processing unit (vCPU), wherein the vCPU is associated with the physical central processing unit (CPU); determining, by the hypervisor, a portion of execution time of the physical CPU to be reserved for host execution; and notifying the VM of a portion of CPU time that is reserved for host execution.

Example 2 is a method of example 1, further comprising: receiving, by the hypervisor, execution control of the physical CPU; executing, by the hypervisor, a task using the physical CPU; and returning, by the hypervisor, execution control of the physical CPU to the VM.

Example 3 is a method of example 2, wherein receiving execution control of the physical CPU comprises detecting a VM exit caused by the VM.

Example 4 is a method of example 2, wherein returning execution control of the physical CPU to the VM is performed upon expiration of the portion of CPU time reserved for host execution.

Example 5 is a method of example 1, wherein the portion of CPU time to be reserved for the host execution is a share of total CPU time.

Example 6 is a method of example 1, wherein the portion of CPU time to be reserved for the host execution is specified as a period of time.

Example 7 is a method of example 1, wherein notifying the VM of the portion of CPU time comprises: writing scheduling parameters, comprising the portion of CPU time that is reserved for the host execution, to memory buffer that is mapped to VM address space accessible to the VM; executing a VM entry that transfers execution control to the VM and causes the VM to schedule a balloon process for the portion of CPU time that is reserved for the host execution.

Example 8 is a method of example 1, wherein notifying the VM of the portion of CPU time comprises: writing scheduling parameters, comprising the portion of CPU time that is reserved for the host execution, to unused bits of a virtual machine control structure associated with the VM that is accessible to the VM; executing a VM entry that transfers execution control to the VM and causes the VM to schedule a balloon process for the portion of CPU time that is reserved for the host execution.

Example 9 is a system comprising: a memory; and a processor operatively coupled to the memory, to execute a virtual machine (VM) comprising a virtual central processing unit (vCPU) that is associated with a physical CPU of the system to: receive a notification of a portion of execution time of the physical CPU to be reserved for host execution; schedule a balloon task to be executed for a period of time specified by the portion of CPU time to be reserved for host execution; and return execution control of the physical CPU to a hypervisor on the host computer system by executing an instruction of the balloon task.

Example 10 is a system of example 9, wherein to receive the notification of the portion of the CPU time of the physical CPU to be reserved for host execution, the processor is to: read scheduling parameters comprising the portion of the CPU time of the physical CPU to be reserved for host execution from previously unused bit of a virtual machine control structure (VMCS) associated with the VM, wherein the scheduling parameters were written to the previously unused bits of the VMCS by the hypervisor.

Example 11 is a system of example 9, wherein to receive the notification of the portion of the CPU time of the physical CPU to be reserved for host execution, the processor is to: read scheduling parameters comprising the portion of the CPU time of the physical CPU to be reserved for host execution from memory buffer mapped to VM address space, wherein the scheduling parameters were written to the memory buffer by the hypervisor.

Example 12 is a system of example 9, wherein the processor is further to: receive, from the hypervisor, execution control of the vCPU; and stop execution of the balloon task.

Example 13 is a system of example 12, wherein to stop execution of the balloon task, the processor is to: execute a return instruction within the balloon task.

Example 14 is a system of example 12, wherein to stop execution of the balloon task, the processor is to: preempt, by a scheduler within the VM, the balloon task.

Example 15 is a system of example 12, wherein to receive execution control of the vCPU, the processor is to: receive execution control via a VM resume command caused by the hypervisor.

Example 16 is a system of example 9, wherein to return execution control of the physical CPU to the hypervisor, the processor is to: execute the instruction in the balloon task causing a VM exit.

Example 17 is a system of example 9, wherein the processor is further to: receive execution control of the vCPU at a time before the period of time for the balloon task has expired; determine an amount of remaining time for execution of the balloon task using the time which execution control of the vCPU was received from the hypervisor and the specific period of time for the balloon task; and upon determining the amount of remaining time is above a threshold, return execution control of the physical CPU to the hypervisor.

Example 18 is a non-transitory computer readable storage medium, having instructions stored therein, which when executed by a processing device of a computer system, cause the processing device to execute a hypervisor to: receive, from a virtual machine (VM) running on a host system, execution control of a physical central processing unit (CPU), wherein the VM comprises a virtual central processing unit (vCPU) that is associated with the physical CPU; determine an updated portion of CPU time to be reserved for future host execution using provisioning information of the physical CPU to one or more vCPUs; and notify the VM of the updated portion of CPU time that is reserved for host execution.

Example 19 is a non-transitory computer readable storage medium of example 18, wherein the processing device is further to: upon receiving the execution control of the physical CPU, execute a task using the physical CPU.

Example 20 is a non-transitory computer readable storage medium of example 18, wherein to notify the VM of the updated portion of CPU time, the processing device is to: write scheduling parameters, comprising the portion of CPU time that is reserved for host execution, to memory buffer that is mapped to VM address space accessible to the VM; execute a VM entry command to return execution control of the vCPU back to the VM.

Example 21 is a non-transitory computer readable storage medium of example 18, wherein to notify the VM of the updated portion of CPU time, the processing device is to: write scheduling parameters, comprising the portion of CPU time that is reserved for host execution, to unused bits of a virtual machine control structure associated with the VM; execute a VM entry command to return execution control of the vCPU back to the VM.

Example 22 is a non-transitory computer readable storage medium of example 18, wherein to determine the updated portion of CPU time to be reserved for future host execution, the processing device is to: provision a second vCPU of the one or more vCPUs for the VM; and determine the updated portion of CPU time to be reserved for future host execution using provisioning information of the second vCPU of the one or more vCPUs.

Example 23 is a non-transitory computer readable storage medium of example 22, wherein the processing device is further to: determine a second portion of CPU time to be reserved for future host execution using provisioning information of the physical CPU to one or more vCPUs, wherein the second portion of CPU time is associated with the second vCPU; write scheduling parameters, comprising the second portion of CPU time to be reserved for future host execution, to memory buffer that is mapped to VM address space accessible to the VM; and execute a VM entry command to return execution control of the vCPU back to the VM.

Example 24 is a non-transitory computer readable storage medium of example 22, wherein the processing device is further to: determine a second portion of CPU time to be reserved for future host execution using provisioning information of the physical CPU to one or more vCPUs, wherein the second portion of CPU time is associated with the second vCPU; write scheduling parameters, comprising the second portion of CPU time to be reserved for future host execution, to memory buffer that is mapped to VM address space accessible to the VM; and execute a VM entry command to return execution control of the vCPU back to the VM.

Example 25 is a non-transitory computer readable storage medium of example 18, wherein to determine the updated portion of CPU time to be reserved for future host execution, the processing device is to: decommission a second vCPU of the one or more vCPUs, wherein the second vCPU was assigned to the VM; and in response to the second vCPU being decommissioned, determine the updated portion of CPU time to be reserved for future host execution.

Example 26 is a method comprising: determining, by a virtual machine (VM) comprising a virtual central processing unit (vCPU) that is associated with a physical central processing unit (CPU) of a host computer system, a scheduling priority for a balloon task that returns execution control of the physical CPU to a hypervisor running on the host system; scheduling the balloon task to be executed; and returning execution control of the physical CPU to the hypervisor by executing an instruction in the balloon task, wherein the instruction is an instruction that causes a VM exit.

Example 27 is a method of example 26, wherein the balloon task is scheduled to be executed for a period of time specified by a portion of CPU time to be reserved for host execution.

Example 28 is a method of example 26, wherein scheduling of the balloon task is scheduled using scheduling parameters read by the VM, wherein the scheduling parameters are stored by the hypervisor in memory buffer mapped to VM address space.

Example 29 is a method of example 26, further comprising: receiving, from the hypervisor, execution control of the vCPU; and stopping execution of the balloon task.

Example 30 is a method of example 29, wherein stopping execution of the balloon task comprises executing, by the VM, a return instruction within the balloon task.

Example 31 is a method of example 29, wherein stopping execution of the balloon task comprises preempting, by a scheduler within the VM, the balloon task.

Example 32 is a method of example 29, wherein receiving execution control of the vCPU comprises receiving execution control caused by a VM resume command executed by the hypervisor.

Example 33 is a method comprising: executing, by a hypervisor executing on a computer system, a virtual machine (VM) comprising a virtual central processing unit (vCPU), wherein the VCPU is associated with a physical central processing unit (CPU); determining, by the hypervisor, a first portion of CPU time to be reserved for host execution; notifying the VM of the first portion of CPU time that is reserved for host execution; receiving, by the hypervisor, execution control of the physical CPU from the VM; upon receiving execution control of the physical CPU from the VM, detecting, by the hypervisor, that the VM exceeded an allocated timeslot for VM execution determined by when execution control was received from the VM; determining, by the hypervisor, a second portion of CPU time to be reserved for host execution, wherein the second portion of CPU time is greater than the first portion of CPU time based upon the VM exceeding the allocated timeslot for VM execution; and notifying, by the hypervisor, the VM of the second portion of CPU time that is reserved for host execution.

Example 34 is a method of example 33, further comprising: generating a threshold timer that indicates a period of time when the VM is to provide execution control of the physical CPU to the hypervisor; determining, by the hypervisor, that the VM has exceeded the threshold timer by not providing execution control of the physical CPU to the hypervisor; and interrupting, by the hypervisor, the VM by causing a VM Exit.

Example 35 is a method of example 33, further comprising: receiving, by the hypervisor, execution control of the physical CPU from the VM; upon receiving execution control of the physical CPU from the VM, detecting, by the hypervisor, that the VM exceeded the allocated timeslot for VM execution determined by when execution control was received from the VM and the second portion of CPU time to be reserved for host execution; and interrupting, by the hypervisor, the VM by causing a VM Exit.

Example 36 is a method of example 33, wherein notifying the VM of the first portion of CPU time comprises: writing scheduling parameters, comprising the first portion of CPU time that is reserved for the host execution, to memory buffer that is mapped to VM address space accessible to the VM.

Example 37 is a method of example 33, wherein notifying the VM of the first portion of CPU time comprises: writing scheduling parameters, comprising the first portion of CPU time that is reserved for the host execution, to unused bits of a virtual machine control structure associated with the VM that is accessible to the VM.

Example 38 is a method of example 33, wherein notifying the VM of the second portion of CPU time comprises: writing scheduling parameters, comprising the second portion of CPU time that is reserved for the host execution, to memory buffer that is mapped to VM address space accessible to the VM.

Example 39 is a method of example 33, wherein notifying the VM of the second portion of CPU time comprises: writing scheduling parameters, comprising the second portion of CPU time that is reserved for the host execution, to unused bits of a virtual machine control structure associated with the VM that is accessible to the VM.

What is claimed is:

1. A method comprising:
    executing, by a hypervisor running on a host computer system comprising a physical CPU, a virtual machine (VM) comprising a virtual central processing unit (vCPU), wherein the vCPU is associated with the physical central processing unit (CPU);
    determining, by the hypervisor, a portion of CPU execution time of the physical CPU to be reserved for host execution; and
    reserving, by the hypervisor, the portion of CPU execution time by notifying the VM of the portion of CPU execution time to cause the VM to schedule a balloon process for the portion of CPU execution time to be reserved for the host execution, wherein the notifying comprises:
        writing scheduling parameters, comprising the portion of CPU execution time that is reserved for the host execution, to a memory region accessible to the VM; and
        executing a VM entry that transfers execution control to the VM and causes the VM to schedule the balloon process for the portion of CPU execution time that is reserved for the host execution.

2. The method of claim 1, further comprising:
    receiving, by the hypervisor, execution control of the physical CPU;
    executing, by the hypervisor, a task using the physical CPU; and
    returning, by the hypervisor, execution control of the physical CPU to the VM.

3. The method of claim 2, wherein receiving execution control of the physical CPU comprises detecting a VM exit caused by the VM.

4. The method of claim 2, wherein returning execution control of the physical CPU to the VM is performed upon expiration of the portion of CPU execution time reserved for host execution.

5. The method of claim 1, wherein the portion of CPU execution time to be reserved for the host execution is a share of total CPU execution time.

6. The method of claim 1, wherein the portion of CPU execution time to be reserved for the host execution is specified as a period of time.

7. The method of claim 1, wherein notifying the VM of the portion of CPU execution time comprises:
writing scheduling parameters, comprising the portion of CPU execution time that is reserved for the host execution, to memory buffer that is mapped to VM address space accessible to the VM.

8. The method of claim 1, wherein notifying the VM of the portion of CPU execution time comprises:
writing scheduling parameters, comprising the portion of CPU execution time that is reserved for the host execution, to unused bits of a virtual machine control structure associated with the VM that is accessible to the VM.

9. A system comprising:
a memory; and
a processor operatively coupled to the memory, to execute a virtual machine (VM) comprising a virtual central processing unit (vCPU) that is associated with a physical CPU of the system to:
receive a notification of a portion of CPU execution time of the physical CPU to be reserved for system execution, wherein to receive the notification of the portion of CPU execution time, the processor is to read scheduling parameters comprising the portion of the CPU execution time of the physical CPU from a memory region accessible to the VM, and wherein the scheduling parameters were written to the memory region by a hypervisor on the system;
schedule a balloon task to be executed for a period of time specified by the portion of CPU execution time; and
return execution control of the physical CPU to the hypervisor on the system by executing an instruction of the balloon task.

10. The system of claim 9, wherein to receive the notification of the portion of the CPU execution time of the physical CPU, the processor is to:
read the scheduling parameters comprising the portion of the CPU time of the physical CPU to be reserved for the system execution from previously unused bit of a virtual machine control structure (VMCS) associated with the VM, wherein the scheduling parameters were written to the previously unused bits of the VMCS by the hypervisor.

11. The system of claim 9, wherein to receive the notification of the portion of the CPU execution time of the physical CPU, the processor is to:
read the scheduling parameters comprising the portion of the CPU execution time of the physical CPU to be reserved for the system execution from a memory buffer mapped to VM address space, wherein the scheduling parameters were written to the memory buffer by the hypervisor.

12. The system of claim 9, wherein the processor is further to:
receive, from the hypervisor, execution control of the vCPU; and
stop execution of the balloon task.

13. The system of claim 12, wherein to stop execution of the balloon task, the processor is to:
execute a return instruction within the balloon task.

14. The system of claim 9, wherein to return execution control of the physical CPU to the hypervisor, the processor is to:
execute the instruction in the balloon task causing a VM exit.

15. The system of claim 9, wherein the processor is further to:
receive execution control of the vCPU at a time before the period of time for the balloon task has expired;
determine an amount of remaining time for execution of the balloon task using time at which execution control of the vCPU was received from the hypervisor and the specific period of time for the balloon task; and
upon determining the amount of remaining time is above a threshold, return execution control of the physical CPU to the hypervisor.

16. A non-transitory computer readable storage medium, having instructions stored therein, which when executed by a processing device of a host system, cause the processing device to execute a hypervisor to:
receive, from a virtual machine (VM) running on the host system, execution control of a physical central processing unit (CPU), wherein the VM comprises a virtual central processing unit (vCPU) that is associated with the physical CPU;
determine an updated portion of physical CPU execution time to be reserved for future host execution using provisioning information of the physical CPU to one or more vCPUs of the hypervisor;
reserve the updated portion of physical CPU execution time by notifying the VM of the updated portion of physical CPU execution time to cause the VM to schedule a balloon process for the updated portion of physical CPU execution time, wherein the notifying comprises:
writing scheduling parameters, comprising the portion of CPU execution time that is reserved for the host execution, to a memory region accessible to the VM; and
executing a VM entry that transfers execution control to the VM and causes the VM to schedule a balloon process for the portion of CPU execution time that is reserved for the host execution.

17. The non-transitory computer readable storage medium of claim 16, wherein the processing device is further to:
upon receiving the execution control of the physical CPU, execute a task using the physical CPU.

18. The non-transitory computer readable storage medium of claim 16, wherein to notify the VM of the updated portion of CPU execution time, the processing device is to:
write scheduling parameters, comprising the updated portion of CPU execution time that is reserved for host execution, to memory buffer that is mapped to VM address space accessible to the VM.

19. The non-transitory computer readable storage medium of claim 16, wherein to notify the VM of the updated portion of CPU execution time, the processing device is to:
write scheduling parameters, comprising the updated portion of CPU execution time that is reserved for host execution, to unused bits of a virtual machine control structure associated with the VM.

20. The non-transitory computer readable storage medium of claim 16, wherein to determine the updated portion of CPU execution time to be reserved for future host execution, the processing device is to:
provision a second vCPU of the one or more vCPUs of the hypervisor for the VM; and
determine the updated portion of CPU execution time to be reserved for future host execution using provisioning information of the second vCPU of the one or more vCPUs.

* * * * *